United States Patent
Hattori et al.

(10) Patent No.: US 9,400,172 B2
(45) Date of Patent: Jul. 26, 2016

(54) FILM THICKNESS MEASUREMENT METHOD

(75) Inventors: Ryo Hattori, Tokyo (JP); Kenichi Hamano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 198 days.

(21) Appl. No.: 14/346,306

(22) PCT Filed: Oct. 26, 2011

(86) PCT No.: PCT/JP2011/074643
§ 371 (c)(1),
(2), (4) Date: Mar. 20, 2014

(87) PCT Pub. No.: WO2013/061417
PCT Pub. Date: May 2, 2013

(65) Prior Publication Data
US 2014/0239181 A1    Aug. 28, 2014

(51) Int. Cl.
*G01B 11/06* (2006.01)
*G01B 9/02* (2006.01)

(52) U.S. Cl.
CPC ............ *G01B 11/06* (2013.01); *G01B 9/02044* (2013.01); *G01B 9/02084* (2013.01); *G01B 11/0625* (2013.01)

(58) Field of Classification Search
CPC .................. G01B 11/06; G01B 11/0625
See application file for complete search history.

(56) References Cited

U.S. PATENT DOCUMENTS

| 4,555,767 A | 11/1985 | Case et al. |
| 5,523,840 A | 6/1996 | Nishizawa et al. |

(Continued)

FOREIGN PATENT DOCUMENTS

| CN | 1746617 A | 3/2006 |
| CN | 102052904 A | 5/2011 |

(Continued)

OTHER PUBLICATIONS

Schumann, The Infrared Interference Method of Measuring Epitaxial Layer Thickness, Mar. 1969, Journal of Electrochemical Society: Electrochemical Technology Technical Papers, vol. 116, Iss. 3, pp. 409-413.*

(Continued)

*Primary Examiner* — David Porta
*Assistant Examiner* — Jeremy S Valentiner
(74) *Attorney, Agent, or Firm* — Studebaker & Brackett PC

(57) ABSTRACT

A measurement target including a semiconductor substrate, and a first epitaxial layer and a second epitaxial layer stacked in this order on the semiconductor substrate and having no difference in refractive index of a real part from the semiconductor substrate is subjected to reflection interference analysis using a Fourier transform infrared spectroscopy. The thickness of the first epitaxial layer is used as a fitting parameter so as to prevent shift between an interference waveform of a resultant reflection interference pattern containing distortion appearing in a wave number range near an abnormal dispersion range of a refractive index caused by phonon absorption and an interference waveform of a numerically calculated reflection interference pattern in the same wave number range. The thickness of the first epitaxial layer determined during the fitting of the numerically calculated reflection interference pattern is defined as a measured value of the thickness of the first epitaxial layer.

3 Claims, 9 Drawing Sheets

(56) References Cited

U.S. PATENT DOCUMENTS

| | | | |
|---|---|---|---|
| 5,587,792 A | | 12/1996 | Nishizawa et al. |
| 5,604,581 A | | 2/1997 | Liu et al. |
| 6,025,596 A | * | 2/2000 | Shirai ............... G01B 11/0625 250/339.11 |
| 2006/0285120 A1 | * | 12/2006 | Aiyer ............... G01B 11/0641 356/503 |
| 2011/0102812 A1 | * | 5/2011 | Nishida ............ G01B 11/0625 356/632 |
| 2012/0012047 A1 | * | 1/2012 | Lu ........................ C30B 25/16 117/85 |

FOREIGN PATENT DOCUMENTS

| | | | |
|---|---|---|---|
| EP | 0631106 | A2 | 12/1994 |
| EP | 0857943 | A2 | 8/1998 |
| JP | 05-113319 | A | 5/1993 |
| JP | 07-004922 | A | 1/1995 |
| JP | 2002-022416 | A | 1/2002 |
| JP | 2002-296012 | A | 10/2002 |
| JP | 2003-050108 | A | 2/2003 |
| JP | 2006-242798 | A | 9/2006 |
| WO | 2004/083776 | A1 | 9/2004 |

OTHER PUBLICATIONS

An Office Action issued by the Chinese Patent Office on Oct. 23, 2015, which corresponds to Chinese Patent Application No. 201180074445.9 and is related to U.S. Appl. No. 14/346,306; with English language translation of Search Report.

The extended European search report issued by the European Patent Office on Feb. 13, 2015, which corresponds to European Patent Application No. 11874773.2-1558 and is related to U.S. Appl. No. 14/346,306.

Notification of Concerning Transmittal of International Preliminary Report on Patentability and Translation of Written Opinion of the International Searching Authority; PCT/JP2011/074643 issued on May 8, 2014.

International Search Report; PCT/JP2011/074643; Dec. 13, 2011.

* cited by examiner

F I G. 1
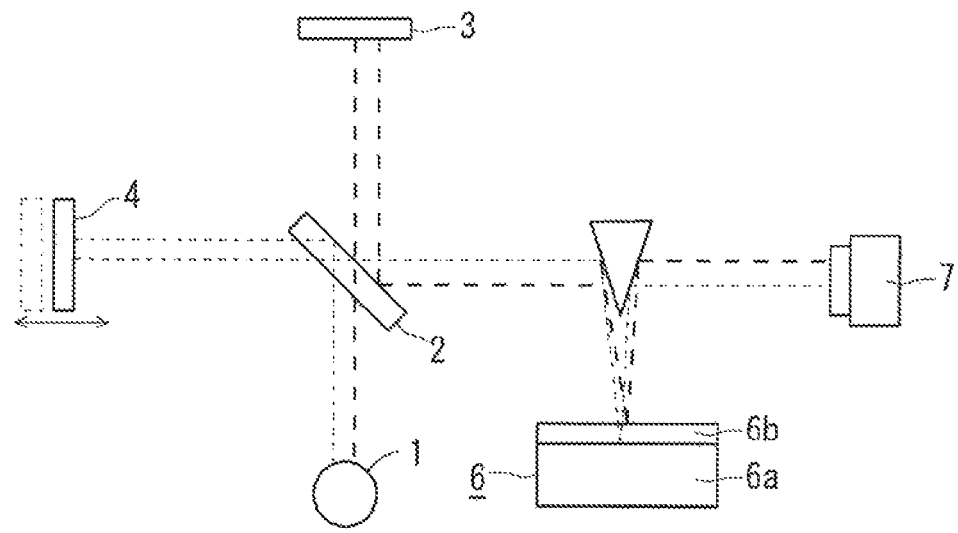
--Background Art--
F I G. 2
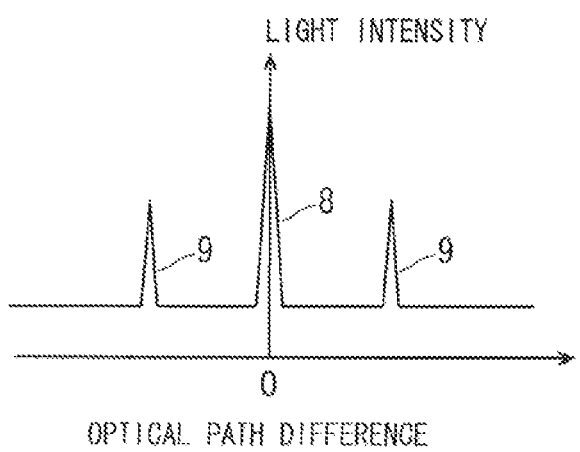
--Background Art--

--Background Art--

F I G . 5
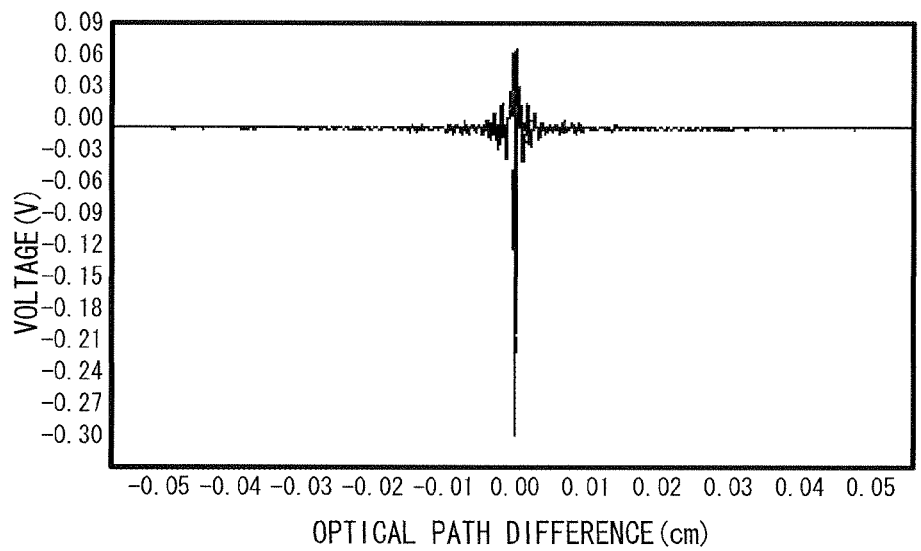
F I G . 6
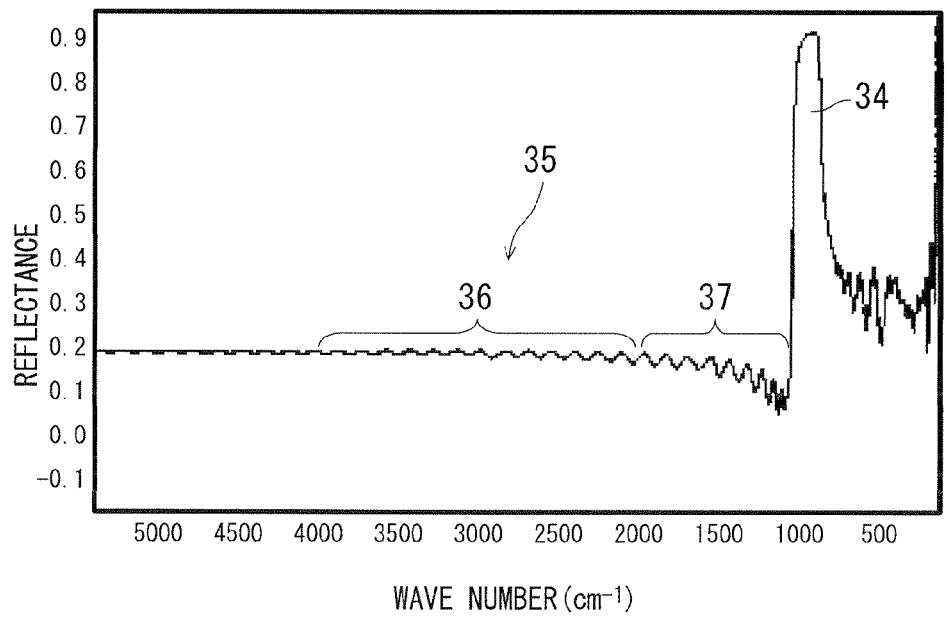

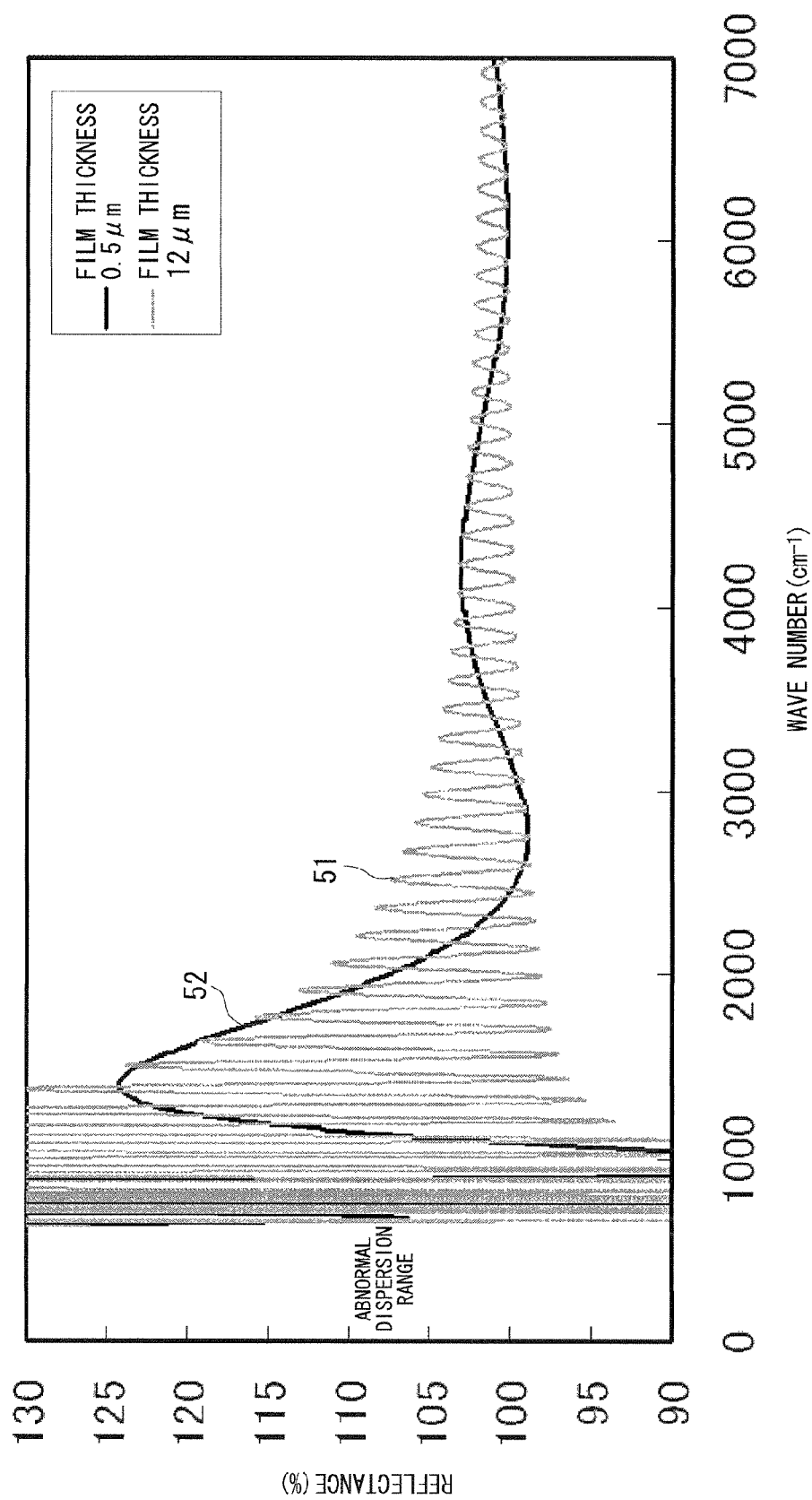

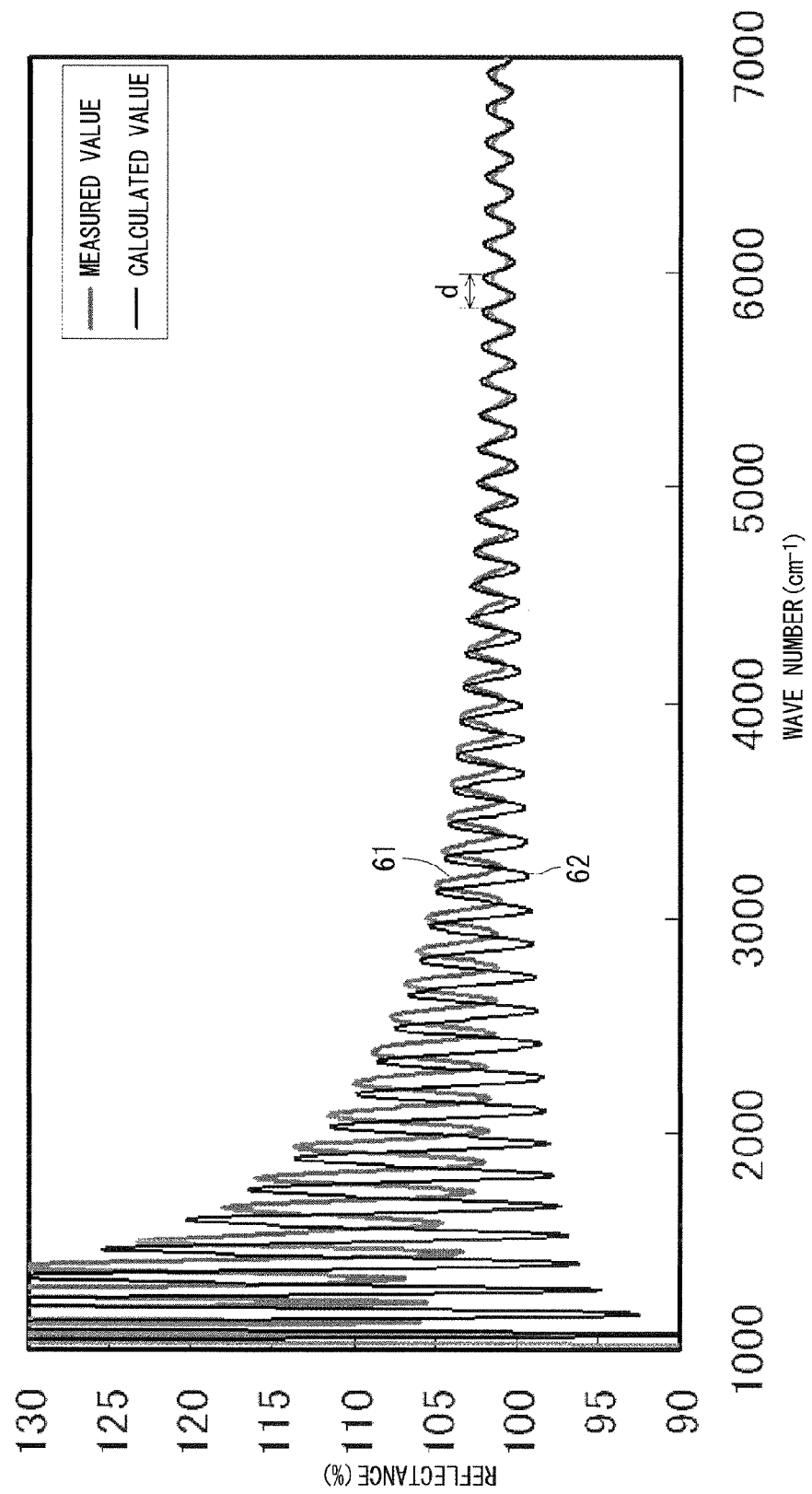

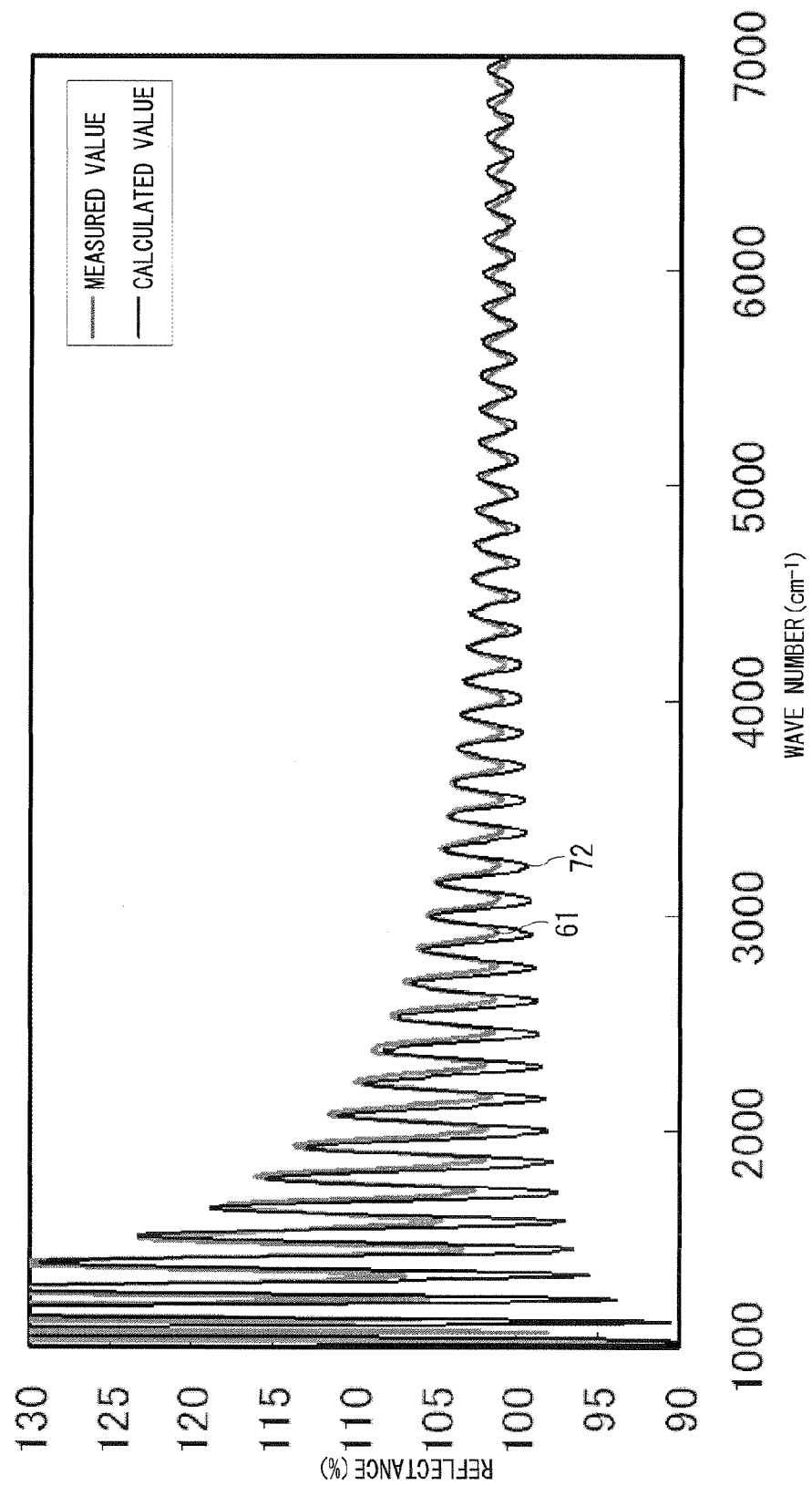

F I G . 1 1
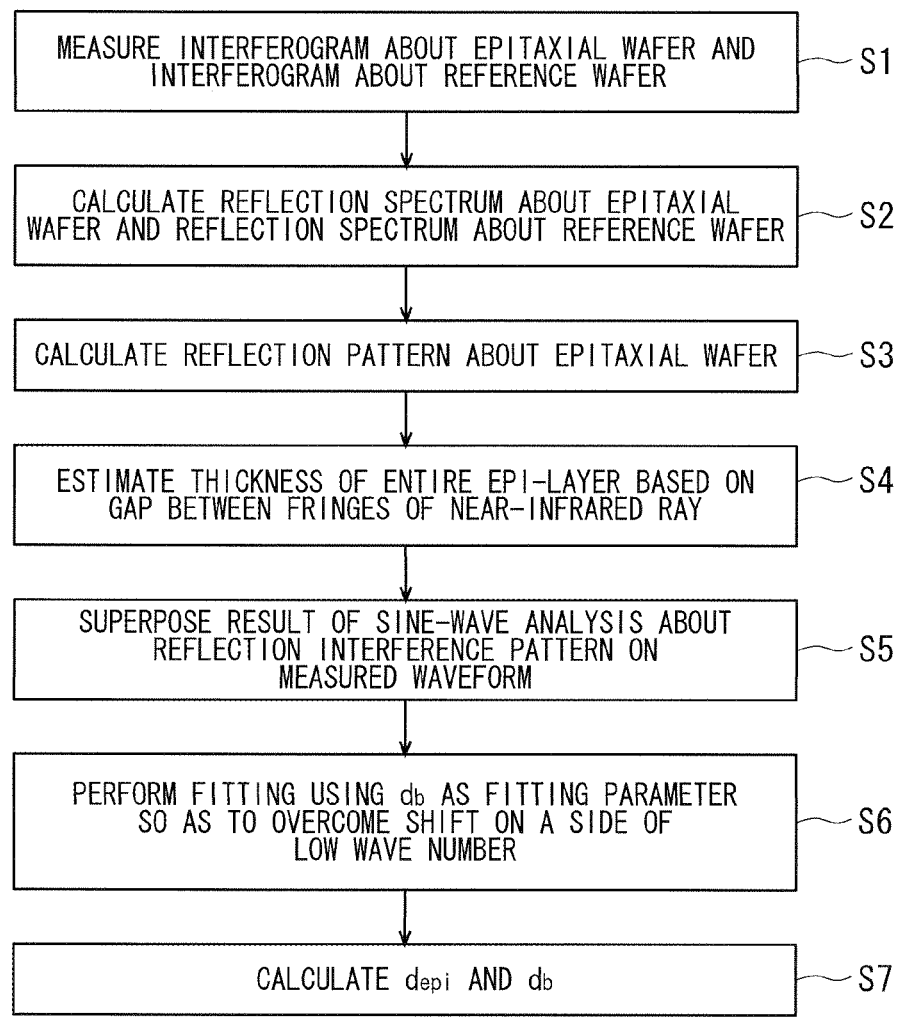

FILM THICKNESS MEASUREMENT METHOD

TECHNICAL FIELD

The present invention relates to a film thickness measurement method and more specifically, to a film thickness measurement method for a multilayer epitaxial layer formed on a semiconductor substrate.

BACKGROUND ART

According to a conventionally known method of measuring the thickness of an epitaxial layer (epi-layer) formed on a semiconductor substrate (wafer) in a nondestructive and noncontact manner, the wafer is irradiated with infrared light, and an interference pattern is analyzed that is generated by a difference between an optical path of interface reflecting light caused by a difference in refractive index observed at an interface between the substrate and the epi-layer and an optical path of surface reflecting light.

As an example, patent literature 1 discloses a method of evaluating the thickness of a multilayer film based on a spatialgram obtained by Fourier transforming an interference spectrum from a multilayer film of a sample using a Fourier transform infrared spectroscopy (FT-IR).

The spatialgram contains bursts that are generated by mutual intensification of total light beams caused by interference when a difference in optical path determined by a traveling position of a moving mirror forming the FT-IR agrees with a difference in optical path between all reflection light components from the sample. Patent literature 1 recites that a distance between the bursts corresponds to the difference in optical path between the reflection light components, and discloses a technique of estimating the thickness of the epi-layer by dividing the distance between the bursts by the refractive index of the epi-layer.

PRIOR ART LITERATURE

Patent Literature

Patent Literature 1: Japanese Patent Application Laid-Open No. 7-4922

SUMMARY OF INVENTION

Problems to be Solved by Invention

The conventional measuring method described above is based on the prerequisite that the refractive index of the epi-layer is constant within a measuring wave number range. Hence, a wave number range available for measurement is limited to a range where refractive index dispersion can be ignored. Meanwhile, like in the case of what is called a homo-epitaxial layer (homo-epi-layer) where crystal in a substrate and crystal in an epi-layer have the same crystal composition, there may be no difference in refractive index of a real part between the substrate and the epi-layer. In this case, a difference in refractive index disappears and an interface waveform cannot be measured in a range of from near-infrared light to visible light apart from an abnormal dispersion range occurring in an infrared range. Hence, film thickness measurement by reflection interference analysis technique has become more difficult.

In an SiC (silicon carbide) power device expected as a future power device that uses an SiC layer as a semiconductor layer, an epi-layer epitaxially grown on an SiC wafer is used as a drift layer. Thus, the SiC power device is given a homo-epi-structure. In this case, the substrate and the epi-layer have the same crystal composition and do not differ except a difference in carrier concentration. Technique that allows analysis of such a film structure includes, in addition to reflection interference analysis technique, CV technique of measuring a carrier concentration based on capacity-voltage (CV) characteristics and SIMS depth profiling technique of measuring the depth profile of impurities with an SIMS (secondary ion-microprobe mass spectrometer) for measurement of an impurity profile. However, if the thickness of the drift layer is some micrometers or more, the CV technique finds its limit in applying a reverse bias due to a breakdown voltage inside the film or on a surface of the film. Hence, a depletion layer cannot extend as far as to a buffer layer formed between the drift layer and the substrate, leading to the probability that the thickness of the buffer layer cannot be measured.

The SIMS depth profiling technique is a destructive test for measurement conducted by forming a crater in part of epitaxial crystal by ion irradiation, imposing an obstruction to manufacture of a device. Additionally, measuring secondary ions while forming a crater by ion irradiation makes it hard to control the shape of the bottom of the crater during the measurement, imposing strict limits on the accuracy of thickness measurement.

The present invention has been made to solve the aforementioned problems. It is an object of the present invention to provide a method of measuring the thickness of a film layer such as a buffer layer formed between a drift layer and a substrate in a multilayer film of a homo-epi-structure by evolving conventional nondestructive and noncontact reflection interference analysis technique.

Means of Solving Problems

A film thickness measuring method of the present invention is a film thickness measurement method conducted by reflection interference analysis using a Fourier transform infrared spectroscopy. The method includes the steps of: (a) preparing a measurement target including a semiconductor substrate, and a first epitaxial layer and a second epitaxial layer stacked in this order on the semiconductor substrate and having no difference in refractive index of a real part from the semiconductor substrate, and by using the Fourier transform infrared spectroscopy, measuring an interferogram about the measurement target and measuring an interferogram about the semiconductor substrate to obtain a reference interferogram; (b) calculating a reflection spectrum about the measurement target and a reference reflection spectrum by Fourier-transforming the interferogram about the measurement target and the reference interferogram; (c) calculating a reflection interference pattern by dividing the intensity of the reflection spectrum about the measurement target by the intensity of the reference reflection spectrum; and (d) fitting a numerically calculated reflection interference pattern to the reflection interference pattern, the numerically calculated reflection interference pattern being obtained by numerical calculation based on the structure of the measurement target. In the step (d), the thickness of the first epitaxial layer is used as a fitting parameter so as to prevent shift between an interference waveform of the reflection interference pattern containing distortion appearing in a wave number range near an abnormal dispersion range of a refractive index caused by phonon absorption and an interference waveform of the numerically calculated reflection interference pattern in the same wave number range, and the thickness of the first epitaxial layer determined during the fitting of the numerically calculated reflection interference pattern is defined as an actually measured value of the thickness of the first epitaxial layer.

Advantageous Effects of Invention

In the film thickness measurement method of the present invention, the thickness of the first epitaxial layer is used as a fitting parameter so as to prevent shift between the interference waveform in a wave number range near the abnormal dispersion range of a refractive index caused by phonon absorption and the interference waveform of the numerically calculated reflection interference pattern in the same wave number range. Further, the thickness of the first epitaxial layer determined during the fitting of the numerically calculated reflection interference pattern is defined as an actually measured value of the thickness of the first epitaxial layer. Thus, the method of the present invention allows film thickness measurement in a multilayer film of a homo-epi-structure.

BRIEF DESCRIPTION OF DRAWINGS

FIG. 1 is a schematic view showing the structure of an optical system of an FT-IR.
FIG. 2 explains a spatialgram.
FIG. 5 shows an interferogram obtained by using the FT-IR.
FIG. 6 shows a reflection interference pattern obtained from the interferogram.
FIG. 8 shows a reflection interference pattern of a single epi-layer obtained by numerical calculation.
FIG. 9 shows a reflection interference pattern of a multilayer epi-layer obtained with the FT-IR and a reflection interference pattern obtained by conventional numerical calculation.
FIG. 10 shows the reflection interference pattern of the multilayer epi-layer obtained with the FT-IR and a reflection interference pattern obtained by numerical calculation of the present invention.
FIG. 11 is a flowchart explaining a film thickness measurement method of the present invention.

DESCRIPTION OF EMBODIMENT(S)

First Embodiment

Figure 3:
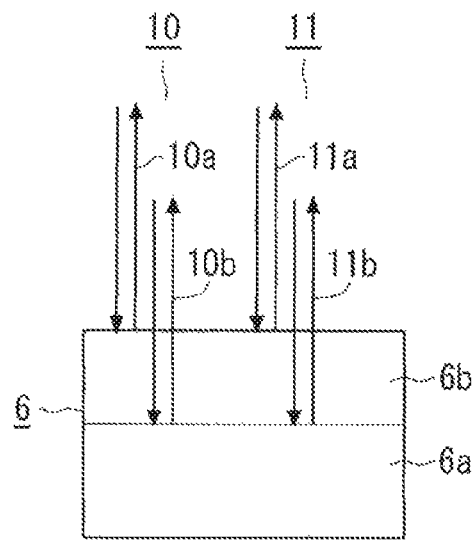
FIG. 3 schematically shows reflection of light in a sample.

<Introduction>
Film thickness measurement by reflection interference analysis technique using a Fourier transform infrared spectroscopy (FT-IR) is described before description of an embodiment.
FIG. 1 is a schematic view showing the structure of an optical system of the FT-IR. The optical system of the FT-IR generally uses the Michelson interferometer shown in FIG. 1. As shown in FIG. 1, the Michelson interferometer includes a light source 1, a half mirror 2, a fixed mirror 3, a moving mirror 4, a reflection mirror 5, and a detector 7. A sample 6 is composed of a substrate 6a and a thin film 6b formed on the substrate 6a.

Principles of film thickness measurement using the FT-IR are explained while using FIG. 1. In FIG. 1, continuous light emitted from the light source 1 is split into light beams by the half mirror 2. One of the light beams is caused to enter the fixed mirror 3 whereas the other is caused to enter the moving mirror 4. The light beams having reflected off the respective mirrors return to the half mirror 2, then reflect off the reflection mirror 5, and thereafter travel toward the sample 6. The light beams having reflected off the sample 6 pass through the reflection mirror 5 and are then measured in intensity by the detector 7.

Dependence of intensity of light detected by the detector 7 on the travel distance of the moving mirror 4 is measured while moving the moving mirror 4 in the direction of an arrow of FIG. 1. A film interference spectrum thereby obtained is called an interferogram. The travel distance of the moving mirror 4 corresponds to an optical distance, so that the interferogram is considered as a film interference spectrum using the optical distance as a function. This film interference spectrum is Fourier transformed with the FT-IR to obtain a spatialgram.

FIG. 2 explains the spatialgram. As shown in FIG. 2, the spatialgram is defined by a difference in optical path (unit omitted) on the horizontal axis and light intensity (unit omitted) on the vertical axis. The spatialgram contains multiple peaks called a center burst 8 and side bursts 9. The side bursts 9 appear in symmetric positions with respect to the center burst 8.

FIG. 3 schematically shows reflection of light in the sample 6. In FIG. 3, light to enter the sample 6 follows a path (hereinafter called a path A) from the light source 1 to the sample 6 via the moving mirror 4 and the reflection mirror 5, and a path (hereinafter called a path B) from the light source 1 to the sample 6 via the fixed mirror 3 and the reflection mirror 5.

As shown in FIG. 3, light following the path A to enter the sample 6 and reflect off the sample 6 is called a light beam 10, and light following the path B to enter the sample 6 and reflect off the sample 6 is called a light beam 11. The light beams 10 and 11 include a reflecting light beam 10a and a reflecting light beam 11a respectively reflecting off a surface of the thin film 6b, and a reflecting light beam 10b and a reflecting light beam 11b respectively reflecting off an interface between the thin film 6b and the substrate 6a.

If a light beam following the path A travels an optical distance to the detector 7 after reflecting off the sample 6 and this optical distance is the same as that a light beam following the path B travels to the detector 7 after reflecting off the sample 6, light beams of all wave numbers come into agreement in phase with each other to intensify each other, thereby increasing a signal strength. A peak corresponding to the highest light intensity appears as the center burst 8. If a difference is generated between the aforementioned two optical distances by shifting the position of the moving mirror 4, light beams may intensify each other or cancel each other according to a wave number. In this case, a signal strength becomes lower than that obtained in the case where the aforementioned two optical distances agree with each other.

If a light beam following the path A travels an optical distance to the detector 7 after reflecting off the surface of the thin film 6b and this optical distance is the same as that a light beam following the path B travels to the detector 7 after reflecting off the interface between the thin film 6b and the substrate 6a, light beams of all wave numbers come into agreement in phase with each other to intensify each other, thereby increasing a signal strength. Likewise, if a light beam following the path A travels an optical distance to the detector 7 after reflecting off the interface between the thin film 6b and the substrate 6a and this optical distance is the same as that a light beam following the path B travels to the detector 7 after reflecting off the surface of the thin film 6b, light beams of all wave numbers also come into agreement in phase with each other to intensify each other, thereby increasing a signal strength. These peaks appear as the side burst 9.

As described above, the spatialgram contains the center burst 8 appearing as a result of interference between light beams both reflecting off the top surface of the sample 6 and interference between light beams both reflecting off the interface between the thin film 6b and the substrate 6a, and the side bursts 9 appearing as a result of interference between a light beam reflecting off the top surface of the sample 6 and a light beam reflecting off the interface between the thin film 6b and the substrate 6a.

The side bursts 9 appear in symmetric positions with respect to the center burst 8. Further, a distance between the center burst 8 and the side bursts 9 corresponds to an optical distance of light traveling to and from the thin film 6b. Thus, a film thickness can be obtained by multiplying this optical distance by the refractive index of the thin film 6b.

As described above, in the film thickness measurement by the reflection interference analysis technique using the FT-IR, a film thickness is measured based on a distance between a side burst and a center burst of a spatialgram. Meanwhile, as described previously, this film thickness measurement is based on the prerequisite that the refractive index of a layer targeted for measurement is constant within a measuring wave number range. Hence, a wave number range available for measurement is limited to a range where refractive index dispersion can be ignored. Meanwhile, like in the case of a homo-epi-layer for example where there is no difference in refractive index of a real part between a substrate and an epi-layer, a difference in refractive index disappears and an interface waveform cannot be measured in a range of from near-infrared light to visible light apart from an abnormal dispersion range occurring in an infrared range.

Hence, a film thickness has conventionally been obtained by using a refractive index determined in a wave number range where the refractive index of a layer targeted for measurement is considered to be substantially constant.

In an SiC power device, a thin layer called a buffer layer of a thickness of from about 0.5 to about 1 μm (500 nm to 1000 nm) having a carrier concentration of an intermediate value between those of a drift layer and a substrate is generally formed between the drift layer and the substrate. This layer is intended to relax crystal strains due to the carrier concentration of the drift layer and that of the substrate that differ as much as by three or four orders of magnitude, thereby enhancing the crystalline properties of the drift layer.

The buffer layer and the drift layer as an epi-layer are generally stacked successively by epitaxial growth. The quality of the buffer layer largely affects the crystalline quality of the drift layer.

Thus, the quantitative management of the thickness and the carrier concentration of the buffer layer is an important issue in controlling the crystalline properties of the drift layer. However, the conventional Fourier analysis technique on a reflection interference waveform requires an interference waveform in an extensive continuous wave number measurement range of 5000 $cm^{-1}$ or more for measurement of a thickness about 0.5 μm, whereas it can obtain a continuous wave number measurement range of only from about 1500 $cm^{-1}$ to about 4000 $cm^{-1}$ such about 2500 $cm^{-1}$ where refractive index dispersion can be ignored. This makes measurement of the buffer layer impossible.

The present inventors examined and evolved the conventional reflection interference analysis technique, and developed a method of measuring the thickness of a thin layer such as a buffer layer formed between a drift layer and a substrate.

<Examination of Reflection Interference Analysis Technique>

Figure 4:
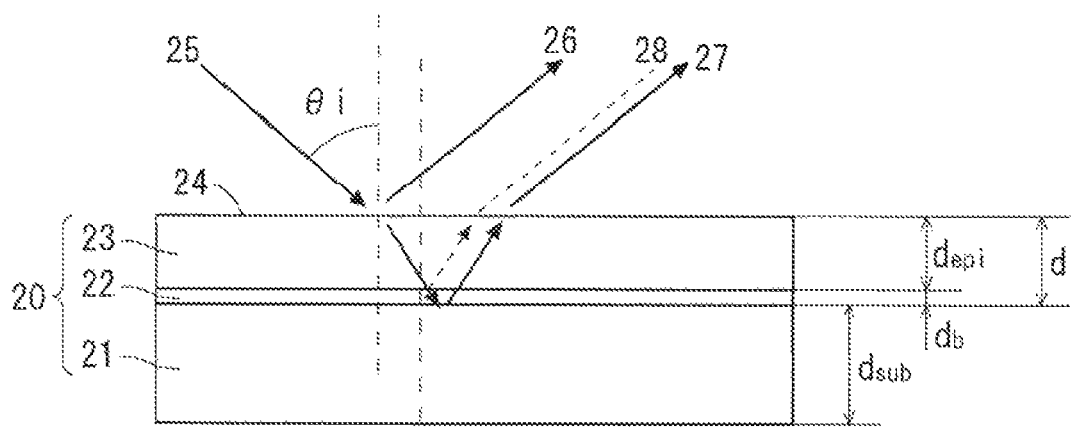
FIG. 4 shows the sectional structure of a target of film thickness measurement.

Examination of the conventional reflection interference analysis technique is explained next while using FIGS. 4 to 10. FIG. 4 shows the sectional structure of a sample 20 targeted for film thickness measurement. The sample 20 of FIG. 4 shows a general epitaxial structure of an SiC power device including an n-type SiC substrate 21, a buffer layer 22 (epilayer) formed on the SiC substrate 21, and a drift layer 23 (epi-layer) formed on the buffer layer 22. The sample 20 is placed in atmosphere 24. FIG. 4 shows an irradiation light flux 25, a reflecting light flux 26 reflecting off a surface of the drift layer 23, a reflecting light flux 27 reflecting off an interface between the buffer layer 22 and the SiC substrate 21 (epi-substrate interface), and a reflecting light flux 28 reflecting off an interface between the buffer layer 22 and the drift layer 23.

The incident angle of the irradiation light flux 25 is θi. The thickness, n-type carrier concentration, refractive index of a real part, and extinction coefficient of the SiC substrate 21, those of the buffer layer 22, and those of the drift layer 23 are expressed as follows: $d_{sub}/N_{sub}/n_{sub}/k_{sub}$, $d_b/N_b/n_b/k_b$, and $d_{epi}/N_{epi}/n_{epi}/k_{epi}$. The refractive index of the atmosphere is expressed as $n_o$.

The carrier concentration $N_{sub}$ of the SiC substrate 21 is $8 \times 10^{18}$ $cm^{-3}$, the carrier concentration $N_b$ of the buffer layer 22 is $1 \times 10^{18}$ $cm^3$, and the carrier concentration $N_{epi}$ of the drift layer 23 is $1 \times 10^{16}$ $cm^3$. The thickness $d_b$ of the buffer layer 22 is 0.5 μm, and the thickness $d_{epi}$ of the drift layer 23 is 12 μm.

The reflecting light fluxes 26 to 28 resulting from the irradiation light flux 25 are measured using an FT-IR having the optical system described while using FIG. 1 to obtain an interferogram such as that of FIG. 1. The FT-IR includes, in addition to the optical system of FIG. 1 such as the Michelson interferometer, a data processor that processes data about light intensity measured by the detector 7. This data processor is composed for example of a personal computer. A CPU executes certain software to realize the data processing.

The interferogram of FIG. 5 is defined by a difference in optical path (cm) on the horizontal axis and light intensity (V) on the vertical axis represented as a voltage detected by the detector. The interferogram of FIG. 5 shows the measurement result itself obtained with the FT-IR.

The interferogram of FIG. 5 shows the measurement result about the sample 20 (FIG. 4). In addition to the interferogram of FIG. 5, an interferogram only about the SiC substrate 21 is measured for reference.

The interferogram about the sample 20 and the reference interferogram are both Fourier transformed to obtain a reflection spectrum about the sample 20 and a reference reflection spectrum.

The intensity of the resultant reflection spectrum about the sample 20 is divided by the intensity of the reference reflection spectrum, thereby obtaining a reflection interference pattern shown in FIG. 6.

The reflection interference pattern of FIG. 6 is defined by a wave number ($cm^{-1}$) on the horizontal axis and a reflectance on the vertical axis. A range 34 where a reflectance increases rapidly is observed near a wave number 1000 (Kayser). The range 34 is a reflection range (abnormal dispersion range) generated by abnormal dispersion of a refractive index based on phonon absorption. A reflection interference waveform 35 changing in refractive index based on carrier absorption appears on a side higher in wave number than the range 34. A range 36 where refractive index dispersion is relatively small is selected from the reflection interference waveform 35 and a background reflectance is corrected. Then, a resultant reflection interference waveform is inversely Fourier transformed, thereby obtaining a spatialgram such as that of FIG. 7.

Figure 7:
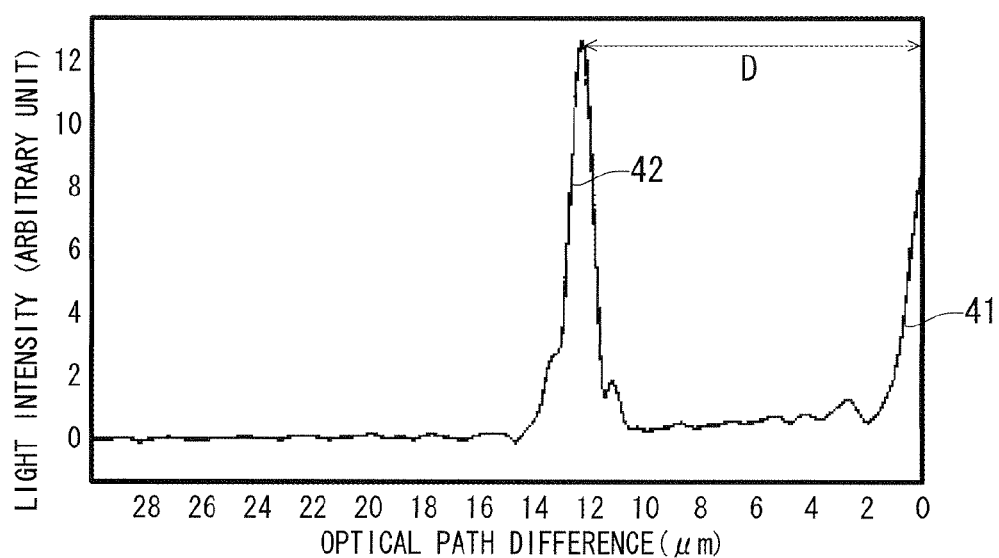
FIG. 7 shows a spatialgram obtained from the reflection interference pattern.

The spatialgram of FIG. 7 is defined by a difference in optical path (μm) on the horizontal axis and light intensity (arbitrary unit) on the vertical axis, and contains a center burst 41 and a side burst 42.

According to the conventional reflection interference analysis technique, a distance D between the center burst 41 and the side burst 42 is multiplied by the refractive index of a layer targeted for measurement, thereby estimating the thickness of the layer targeted for measurement.

However, there is little difference in refractive index between the buffer layer 22 and the drift layer 23 shown in FIG. 4, and the buffer layer 22 is thin. Hence, realistically, it is impossible to separate reflection at the interface between the buffer layer 22 and the drift layer 23 from reflection at the interface between the SiC substrate 21 and the buffer layer 22. Thus, only one peak appears as the side burst 42 as seen from the spatialgram of FIG. 7, and a thickness is measured as the sum of the thickness of the buffer layer 22 and that of the drift layer 23 ($d=d_b+d_{epi}$).

In the reflection interference pattern of FIG. 6, the present inventors paid attention to a reflection interference waveform appearing in a range 37 of relatively large refractive index dispersion near the reflection range 34 generated by abnormal dispersion of a refractive index. The range 37 changes in waveform more largely than the range 36 and has not been used conventionally. The present inventors paid attention to the range 37 for the following reasons.

Specifically, a reflection interference pattern such as that of FIG. 6 was obtained by numerical calculation in the case where only the buffer layer 22 is formed on the SiC substrate 21 to a thickness of 0.5 μm and where only the drift layer 23 is formed on the SiC substrate 21 to a thickness of 12 μm. In this numerical calculation, the wavelength of measurement light was defined as λ, and the following formula (1) was used to obtain a phase difference Δθ generated by a difference in optical path:

[Formula 1]

$$\Delta\theta(\lambda) = \frac{2\pi}{\lambda} 2d\sqrt{(n_i(\lambda)^2 - n_0^2 \cdot \sin^2\theta i)} \quad (1)$$

FIG. 8 shows a result of the numerical calculation (result of sine-wave analysis). In FIG. 8, with the horizontal axis indicating a wave number ($cm^{-1}$) and the vertical axis indicating a reflectance (%), a reflection interference pattern 51 about the drift layer 23 of a thickness of 12 μm and a reflection interference pattern 52 about the buffer layer 22 of a thickness of 0.5 μm are superposed on each other.

It is found from FIG. 8 that the reflection interference pattern 52 about the buffer layer 22 takes on an attenuating waveform of a long cycle and is buried in the reflection interference pattern 51 about the drift layer 23 when synthesized with the reflection interference pattern 51. In particular, it is found that the effect of the reflection interference pattern 52 on the reflection interference pattern 51 becomes smaller particularly in a near-infrared range of a wave number of from 4000 $cm^{-1}$ (λ=2.5 μm) to 7000 $cm^{-1}$ (λ=1.429 μm).

The present inventors reached the conclusion that, in order to obtain information about the buffer layer 22, attention should be paid on an infrared range of a wave number of from 3000 $cm^{-1}$ (λ=3.333 μm) to 1000 $cm^{-1}$ (λ=1.0 μm).

In order to obtain information about the buffer layer 22 in an infrared range, the present inventors conducted precise measurement by using not a thin film measuring device but an FT-IR for more precise analysis. This measurement was conducted on the sample 20 of FIG. 4 including the buffer layer 22 and the drift layer 23.

FIG. 9 shows a result of this measurement. In FIG. 9, with the horizontal axis indicating a wave number ($cm^{-1}$) and the vertical axis indicating a reflectance (%), a reflection interference pattern 61 obtained by actual measurement and a reflection interference pattern 62 obtained by numerical calculation using the aforementioned formula (1) are superposed on each other.

In FIG. 9, in the near-infrared range of a wave number of from 4000 $cm^{-1}$ (λ=2.5 μm) to 7000 $cm^{-1}$ (λ=1.429 μm), an interference waveform of the actually measured value and that of the calculated value show good agreement with each other. However, it is found that in an infrared range on a side of a wave number lower than a wave number of 3000 $cm^{-1}$, a shift (shift amount) between the actually measured value and the calculated value becomes larger as a wave number becomes lower.

Further, it is confirmed that distortion of an interference waveform mentioned herein appearing near an abnormal dispersion range of a refractive index does not appear if only the drift layer is formed while the buffer layer is not formed, and that this distortion changes in response to the structure of the buffer layer.

Taking the aforementioned matters into consideration, the present inventors reached the conclusion that where an infrared range contains information about the buffer layer 22, the conventional numerical calculation using the aforementioned formula (1) cannot reconstruct an interference waveform of the two-layer epi-structure with the buffer layer 22.

Thus, the present inventors regarded distortion of an interference waveform in an infrared range is an effect caused by insertion of the buffer layer 22, and conducted analysis on a reflection interference waveform while adopting an optical model of the buffer layer 22.

More specifically, in the absence of light absorption, specifically if reflection is determined only by a refractive index of a real part, the reflection is accompanied only by a phase shift of 180 degrees. However, in the presence of light absorption, the reflection is accompanied by phase rotation. Light having entered the drift layer 23 passes through the drift layer 23 where the light is not absorbed to enter the SiC substrate 21 where the light is absorbed. Hence, the present inventors speculated that distortion of an interference waveform might be generated by phase rotation caused by the absorption in the SiC substrate 21. However, employing only this speculation could not achieve fitting. Accordingly, the present inventors reached the conclusion that phase rotation to an extent that cannot be accounted for by this speculation is generated.

Hence, the present inventors speculated that in an infrared range on a side of a wave number lower than a wave number of 3000 $cm^{-1}$ and including an abnormal dispersion range of a refractive index, a phase rotates more in response to a lower wave number and incident light takes time in exiting the buffer layer 22 even if the buffer layer 22 is thin, thereby making the buffer layer 22 thick in apparent thickness.

Based on this speculation, the following formula (2) is devised where a phase shift (shift amount) corresponding to distortion of an interference waveform is expressed as $\Delta\phi$.

[Formula 2]

$$\Delta\phi = \tan^{-1}\left(\frac{k \cdot n_b \cdot k_b}{(n_{epi}^2 - n_{sub}^2 - k_{Sub}^2)} \cdot d_b/\lambda\right) \quad (2)$$

In the above formula (2), k is a factor to adjust the effect of the refractive index $n_b$ of the buffer layer 22 and is set to about 1000 to about 10000.

FIG. 10 shows, in a superposed manner, the reflection interference pattern 61 obtained by actual measurement about the sample 20 of FIG. 9 and a reflection interference pattern 72 (numerically calculated reflection interference pattern) obtained by using the following formula (3) to calculate a phase difference $\Delta\theta$ devised by adding the phase shift $\Delta\phi$ corresponding to distortion of an interference waveform expressed by the above formula (2) to $\theta i$ in the formula (1).

[Formula 3]

$$\Delta\theta(\lambda) = \frac{2\pi}{\lambda} 2d \sqrt{n_i(\lambda)^2 - n_0^2 \cdot \sin^2(\theta i + \Delta\phi)} \quad (3)$$

By referring to FIG. 10, the reflection interference pattern 72 is obtained by fitting while using the thickness $d_b$ of the buffer layer 22 in the formula (2) as a fitting parameter and changing the thickness $d_b$ in a way that achieves agreement with the reflection interference pattern 61. The reconstructed interference waveform extends over an entire wave number range from an infrared range of a wave number of 1000 cm$^{-1}$ to a near-infrared range of a wave number of 7000 cm$^{-1}$.

As understood from the above, the phase shift $\Delta\phi$ corresponding to distortion of an interference waveform expressed by the formula (2) can be considered as favorably reconstructing a phase shift in an infrared range on a side of a wave number lower than a wave number of 3000 cm$^{-1}$ in the two-layer epi-structure. Further, the thickness $d_b$ of the buffer layer 22 used in fitting in this case can be considered as an actual thickness of the buffer layer 22 formed on the SiC substrate 21.

As described above, in the film thickness measurement of the homo-epi-structure, information about a thin film can be drawn by analyzing distortion of a reflection interference waveform near an abnormal dispersion range of a refractive index caused by phonon absorption, allowing measurement of the thickness of the thin film.

<Film Thickness Measurement Method>

The film thickness measurement method of the present invention is described below by using the flowchart of FIG. 11 while referring to FIGS. 9 and 10.

First, a sample of a homo-epi-structure (measurement target) such as that of FIG. 4 is prepared. Then, by using an FT-IR, an interferogram about the sample is measured and an interferogram only about a substrate is measured for reference (step S1).

Next, the interferogram about the sample and the reference interferogram are both Fourier transformed to calculate a reflection spectrum about the sample and a reference reflection spectrum (step S2).

Then, the intensity of the resultant reflection spectrum about the sample is divided by the intensity of the reference reflection spectrum, thereby calculating a reflection interference pattern (step S3).

Next, the thickness of an entire epi-layer is estimated based on a gap between fringes in a near-infrared range of the resultant reflection interference pattern (step S4). This operation is described while using FIG. 9. In the reflection interference pattern 61 obtained by actual measurement shown in FIG. 9, this operation corresponds to defining a gap between fringes (gap between crests of an interference wave) in the near-infrared range as a thickness d of the entire epi-layer (including the buffer layer 22 and the drift layer 23). Only one gap between fringes cannot provide accuracy. Thus, multiple gaps between fringes in the near-infrared range are calculated, and the mean value of these gaps is determined as the thickness d.

Next, the reflection interference pattern 72 obtained by using the formula (3) to calculate the phase difference $\Delta\theta$ devised by adding the phase shift $\Delta\phi$ corresponding to distortion of an interference waveform expressed by the formula (2), is superposed on the reflection interference pattern 61 obtained by actual measurement (FIG. 9) (step S5). Then, while using the thickness $d_b$ of the buffer layer 22 in the formula (2) as a fitting parameter, the reflection interference pattern 72 is fitted to the reflection interference pattern 61 so as to overcome a shift of the reflection interference pattern 72 on a side of a low wave number (step S6), as shown in FIG. 10.

The thickness $d_b$ of the buffer layer 22 used in this fitting is determined as the actual thickness of the buffer layer 22. Then, the thickness $d_{epi}$ of the drift layer 23 is obtained by subtracting the thickness $d_b$ from the thickness d of the entire epi-layer estimated in step S4.

<Conversion into Film Thickness>

Figure 12:
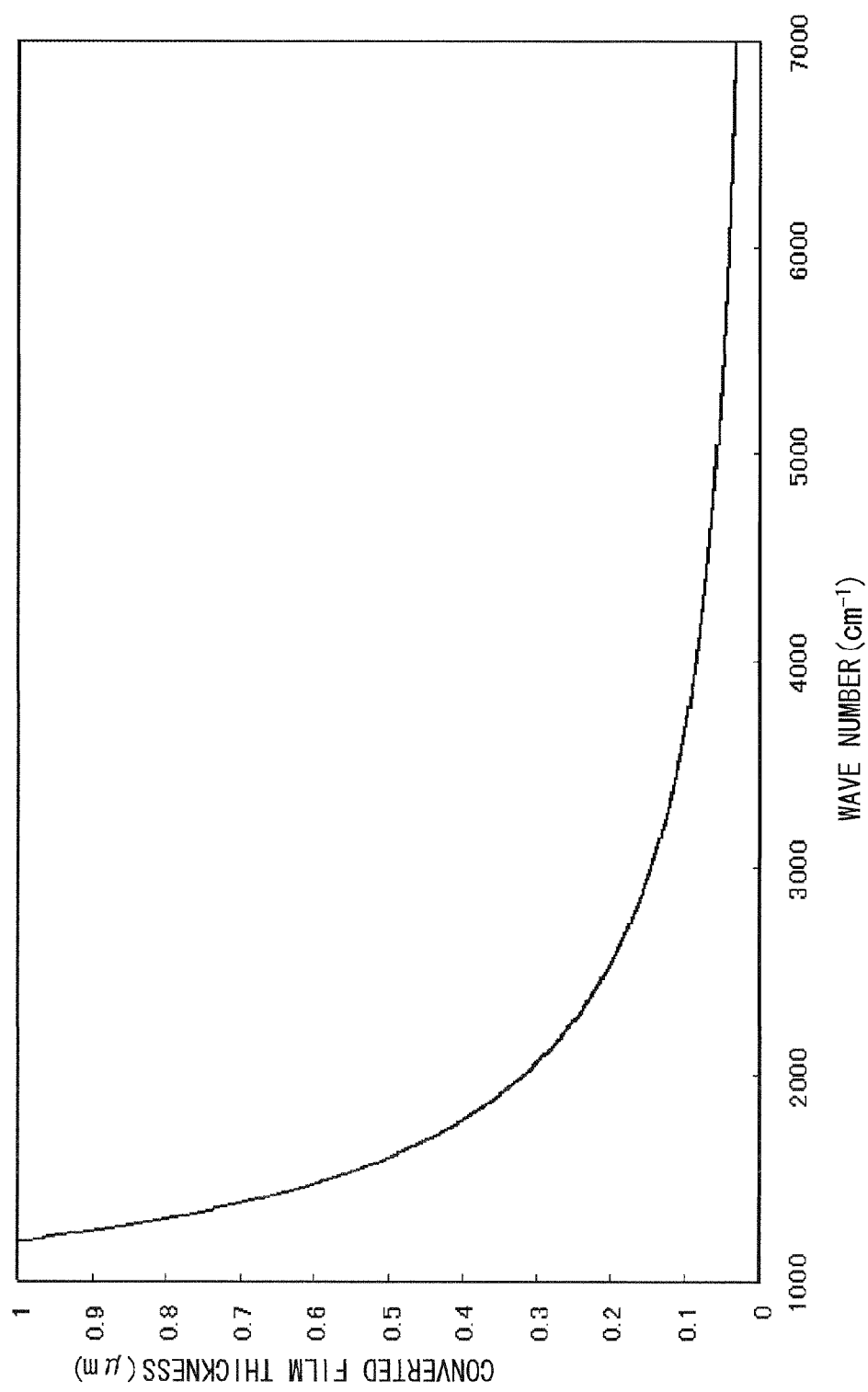
FIG. 12 shows a relationship between an apparent thickness of a buffer layer and a wave number.

As described above, in an infrared range on a side of a wave number lower than a wave number of 3000 cm$^{-1}$, a phase rotates more in response to a lower wave number and incident light takes time in exiting the buffer layer 22 even if the buffer layer 22 is thin, thereby making the buffer layer 22 thick in apparent thickness. Further, the phase shift (shift amount) $\Delta\phi$ corresponding to distortion of an interference waveform is expressed by the formula (2). FIG. 12 shows a relationship between the apparent thickness of the buffer layer 22 causing this phase shift and a wave number.

The phase shift (shift amount) $\Delta\phi$ corresponding to distortion of an interference waveform can be regarded as a difference in optical path in the buffer layer 22. In an infrared range on a side of a wave number lower than a wave number of 3000 cm$^{-1}$, a phase rotates more in response to a lower wave number. This is considered to make the buffer layer 22 thick in apparent thickness to increase a difference in optical path. This apparent thickness is calculated per wave number based on a shift amount of an actually measured value and the calculated apparent thickness is shown in FIG. 12.

FIG. 12 shows a wave number (cm$^{-1}$) on the horizontal axis and a converted film thickness (μm), specifically the apparent thickness on the vertical axis. As shown in FIG. 12, if a wave number is 3000, for example, the apparent thickness becomes about 0.16 μm. If a wave number is 2000, for example, the apparent thickness becomes about 0.32 μm.

The invention claimed is:

1. A film thickness measurement method conducted by reflection interference analysis using a Fourier transform infrared spectroscopy, comprising the steps of:
   (a) preparing a measurement target including a semiconductor substrate, and a first epitaxial layer and a second epitaxial layer stacked in this order on the semiconductor substrate and having no difference in refractive index of a real part from the semiconductor substrate, and by using said Fourier transform infrared spectroscopy, measuring an interferogram about said measurement target and measuring an interferogram about said semiconductor substrate to obtain a reference interferogram;

(b) calculating a reflection spectrum about said measurement target and a reference reflection spectrum by Fourier-transforming said interferogram about said measurement target and said reference interferogram;

(c) calculating a reflection interference pattern by dividing the intensity of said reflection spectrum about said measurement target by the intensity of said reference reflection spectrum; and (d) fitting a numerically calculated reflection interference pattern to said reflection interference pattern, the numerically calculated reflection interference pattern being obtained by numerical calculation based on the structure of said measurement target, wherein in said step (d), the thickness of said first epitaxial layer is used as a fitting parameter so as to prevent shift between an interference waveform of said reflection interference pattern containing distortion appearing in a wave number range near an abnormal dispersion range of a refractive index caused by phonon absorption and an interference waveform of said numerically calculated reflection interference pattern in the same wave number range, and the thickness of said first epitaxial layer determined during the fitting of said numerically calculated reflection interference pattern is defined as an actually measured value of the thickness of said first epitaxial layer.

2. The film thickness measurement method according to claim 1, wherein in said step (d), calculation of said numerically calculated reflection interference pattern uses a formula devised by adding a phase shift $\Delta\phi$ corresponding to distortion of said interference waveform containing said distortion to a formula indicating a phase difference generated by a difference between an optical path of infrared light reflecting off a surface of said second epitaxial layer and an optical path of infrared light reflecting off an interface between said first epitaxial layer and said semiconductor substrate.

3. The film thickness measurement method according to claim 2, wherein said phase shift $\Delta\phi$ is defined by the following formula (1)

$$\Delta\phi = \tan^{-1}\left(\frac{k \cdot n_b \cdot k_b}{(n_{epi}^2 - n_{sub}^2 - k_{sub}^2)} \cdot d_b/\lambda\right) \quad (1)$$

where $n_b$ is the refractive index of a real part of said first epitaxial layer, $k_b$ is the extinction coefficient of said first epitaxial layer, $d_b$ is the thickness of said first epitaxial layer, $n_{epi}$ is the refractive index of a real part of said second epitaxial layer, $n_{sub}$ is the refractive index of a real part of said semiconductor substrate, $k_{sub}$ is the extinction coefficient of said semiconductor substrate, k is a factor to adjust the effect of the refractive index of a real part of said first epitaxial layer, and $\lambda$ is the wavelength of an incident light flux.

\* \* \* \* \*